Sept. 23, 1941.  R. W. PITTMAN  2,256,927
BAKER'S DOUGH CUTTING AND SPREADING MACHINE
Filed Oct. 12, 1939
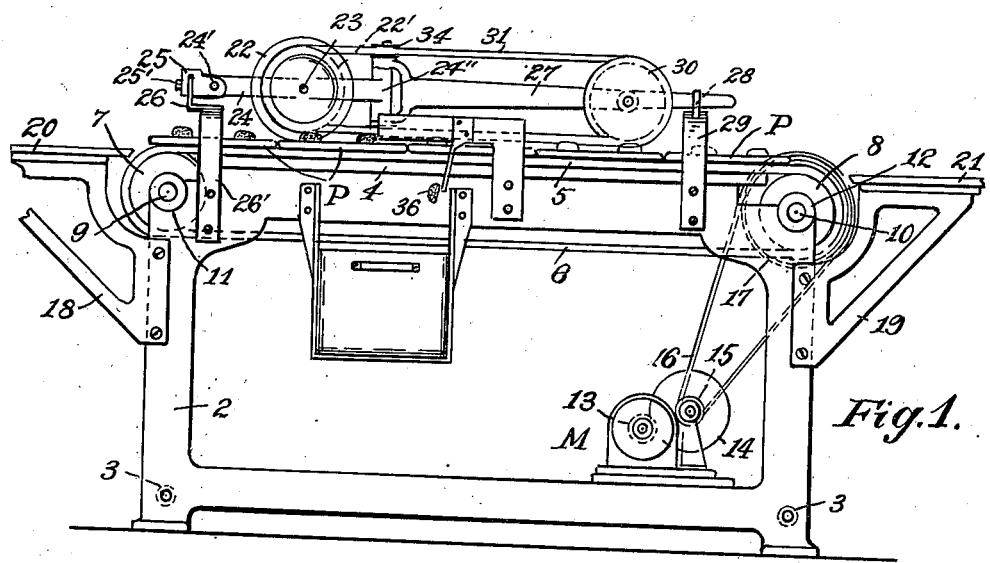
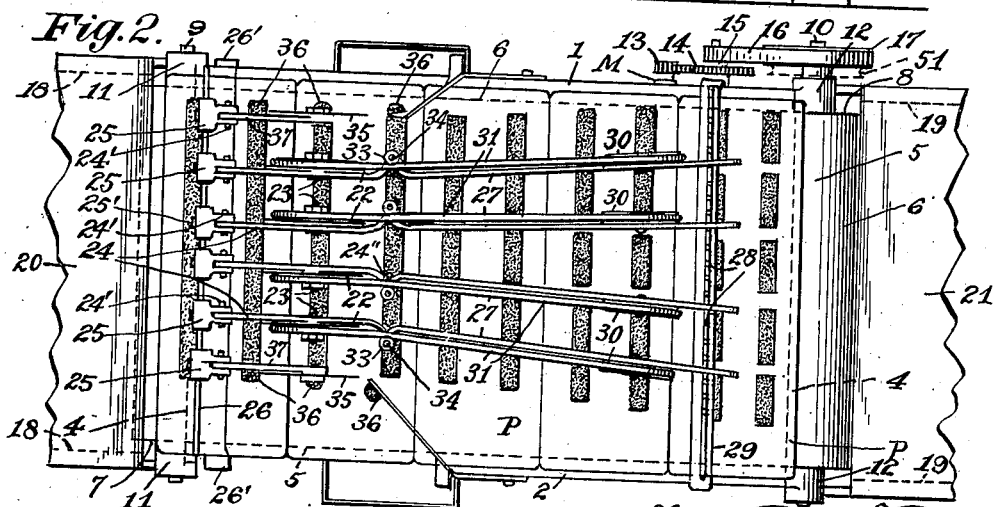
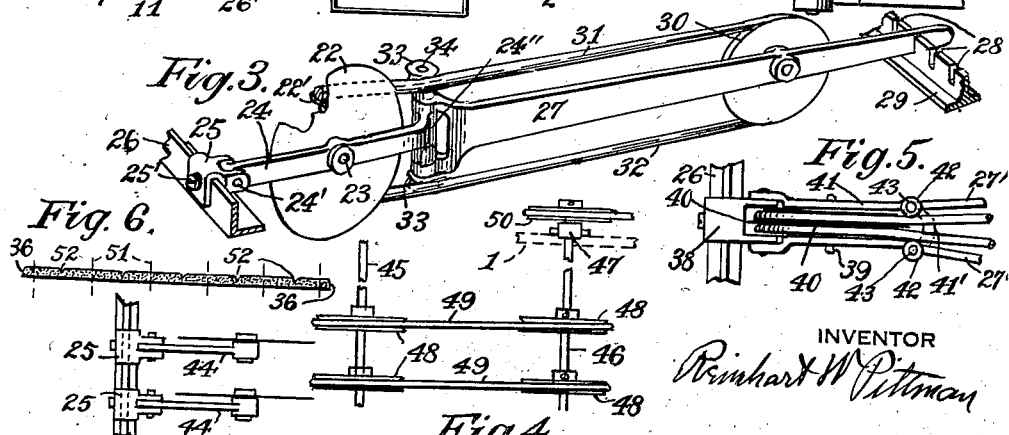
INVENTOR
Rinhart W Pittman Patented Sept. 23, 1941

2,256,927

UNITED STATES PATENT OFFICE 2,256,927

BAKER'S DOUGH CUTTING AND SPREADING MACHINE

Reinhart W. Pittman, Jackson Heights, N. Y.

Application October 12, 1939, Serial No. 299,171

5 Claims. (Cl. 107—22)

This invention relates to machines for use in bakeries, for cutting prepared strips of dough into sections, discharging waste end portions of the strips into a receptacle, and spreading the sections preparatory to being transferred in any desirable manner to the baking oven.

It is the usual custom in bakeries to first prepare comparatively long strips of dough for making so called club rolls, or other small articles to be baked, these strips being placed in position on peel boards, are then by a manual operation severed into sections of uniform length, which is done by a rotary cutter, in the form of a roller, the cutters suitably spaced on a shaft with handles at the outer ends, this roller is rolled across the strips, to sever the strips into sections, and cut a waste portion from each end, then the cut sections are spread, to be separated laterally.

This hand operation as will be understood, is slow since the cutter must be picked up, then rolled across the strips, thereafter the cutter laid aside, the sections then moved to uniform separated positions.

This work all carried out by hand, is slow, and since it is handled by the hands is not sanitary.

It is therefore one object of the present invention to provide a simple, reliable and inexpensive machine, that in a sanitary manner will perform this work automatically, and in a more uniform and rapid manner than can be accomplished by hand.

It is another object to provide rotating cutter knives of which are attached to bearing sleeves, for free rotation on studs, carried on short arms that are pivoted to clamp brackets, and these brackets have an open slot for entrance on a supporting bar at the front of the machine, enabling the ready attachment to the bar at any place from the top, and for adjustment in either direction along the bar.

The short pivoted arms on which the cutter knives are mounted will swing up and down, so the cutter edges of the knives will engage the peel boards, which by this contact rotate the cutters and sever the dough strips into sections while the peel boards are advancing on the conveyor belt.

It is a further object, to provide means for spreading the severed sections, and this means, is only applied to the cutting knives located between the outer knives which simply cut the ends of the strips. The inner rotating cutter knives each have a pulley affixed at one side, the diameter of which is so proportioned that when a belt is in position on the pulley the outer part will firmly engage the top of the dough strips. This belt is held tight and extended by passing over a pulley at the rear of the machine, and is there mounted on a swinging arm the pivot of which is transversely disposed to the pivot of the aforesaid short arm of the clamp bracket, to which this arm is pivoted. The end of the arm is extended to engage any one of a series of notches in a supporting bar at the rear of the machine, which enables the setting of the rear pulley to angular positions, to the right or left, and the belts riding on the cut sections will by the advancing movement of the dough strips be separated laterally.

Other objects will appear as this description proceeds, and will be more fully pointed out, and claimed, in connection with the accompanying drawing, in which, Fig. 1 is a side elevation of my improved machine, showing one form of the mechanism.

Fig. 2 is a plan view of the machine, showing the same, as constructed in Fig. 1.

Fig. 3 is a detail view, showing in perspective, how the cutter knives and spreading belts are mounted.

Fig. 4 is a modification, and shows another form of spreader belts, and how same are driven.

Fig. 5 is a detail view, of a duplex knife bracket, used in the center of a set, when the dough strips are cut into an even number of sections, as four or six.

Fig. 6 is a detail view of a dough strip, showing a partly severed portion, as by scoring the center of the cut sections, as indicated between the dot and dash lines.

As shown, and referring particularly to Figs. 1, 2 and 3, I prefer to construct my machine by providing spaced side frames 1 and 2, held in spaced relation by tie bars 3 at the lower part, and at the top by a plate like member 4, bolted to the top of the frames, which plate further serves as a table over which the top strand 5 of a conveyor belt 6 is supported to provide a moving platform to carry the work and perform the operations that will be presently described.

The conveyor of any suitable material in the form of a belt is mounted on drums 7 and 8, fixed on shafts 9 and 10, the shafts rotating in bearings 11 and 12 at each end of the side frames.

The belt 6 is driven by a motor M, located on a supporting plate on the lower portion of the machine, a pinion 13 on the motor shaft meshes with a spur gear 14 of suitable size, and having a small pulley 15 attached, by which a driving belt 16, drives a pulley 17, of comparatively large diameter fixed to the shaft 10, of the drum 8, to drive the drum, and thereby the belt at the proper speed.

At the front and rear of the frame, brackets are attached, as at 18 and 19, to support at the front, a receiving table 20, and at the rear a delivery table 21.

The work to be performed automatically by this machine follows, peel boards, indicated by P, are used, on which the dough strips of proper proportions are prepared, and so brought to the machine. The operator places the boards on the receiving table 20 and moves them forward on the moving platform, this being done in rapid succession to closely follow each other, and be delivered at the other end on the delivery table 21.

During this forward movement, the strips of dough will pass under a series of rotary cutting knives 22, each mounted on a stud 23, of a pivoted arm 24, pivoted as at 24' to a clamp bracket 25, which is so arranged to be adjustable along a supporting bar 26, located at the front of the machine, and clamped in any desired position in a slotted part thereof, to the bar, and so held by a set screw 25'. The bar is elevated to provide free passage thereunder by downwardly reaching portions 26' of the bar, and by these portions the bar is fixed to the side frames, at the front of the pivoted arm 24 is a hub 24'' that forms one member of a hinge, to which is pivoted a forwardly extending arm 27, the free end of which is seated in notches 28, of a supporting bar 29, this bar except for the notches, is elevated and secured to the side frames by downward extensions, the same as the bar 26.

The axis of the hinge hub 24'', and end of the arm 27 connecting this hub has its axis transverse to the axis of the rotating knives, this will permit angular adjustment of the arm 27 to the cutters, the cutter knives each have a pulley attached to the side thereof, and each arm 27 has a pulley 30 adjacent the free end, over which a belt 31 passes, the lower strand 32 of which engages the work, about the time the dough strips are severed, bearing down on the cut sections, moving along with the peel boards, and gradually shifted laterally to any desired extent to separate the cut sections, this of course is regulated by moving the arm 27 in the notches 28, the belt 31 is guided and prevented from running off the pulleys by providing guide pulleys 33 at ends of the hinge pins 34. From the foregoing it will be seen, the dough strips are severed into sections, then spread, the cutters are driven by contact with the peel boards, and the spreading belts actuated by the pulley of the cutter, the weight of the arm 27 is sufficient to hold the cutters and the belts down on the work.

A pair of cutters 35 are mounted at each side of the set of cutters and spreaders just described, which cuts the end portions 36 from the strips, which, in their forward movement are guided into a receptacle, this rotary knife of the end cutters may be mounted on a short arm 37, pivoted to a clamp bracket, so the cutters may be tilted up when desired, to be free of the peel boards, as may also be done with the cutters and spreaders on the bracket pivot 24'.

These two end cutters 35, as well, the cutters and spreaders, may be set into right and left hand position, as shown in Fig. 2, by simply withdrawing the pivot pin 24' and invert the arm 24 therein, as will be understood.

It will also be noted, by reference to Fig. 2, the center section of the dough strip is not shifted, since here an odd number of sections are cut from the strip, as here shown being five, requiring only the shifting of the two outer sections, and the center section, passing along in a straight forward path.

In Fig. 5, is shown a clamp bracket 38, for use when cutting a strip of dough into an even number of sections, as four or any other even number, and is arranged to support on a stud 39, a single cutter knife 40, the stud 39 supported at both ends of a U shaped arm 41, the free ends of which are pivoted to the clamp bracket, for tilting upward of this arm 41, and the arm has at the joined end 41' two transverse hubs 42 to provide for pivots 43, of two swinging arms 27', (only a portion of which are shown,) are set in right and left hand position, to provide a duplex unit, to spread the first section, each side of the center cut of an even number of sections, the knife has a pulley attached at each side over which belts pass forward to pulleys oppositely disposed on the arms 27', to move the sections each side of the cut, away from each other, as will be readily understood.

In Fig. 4, I have shown a modification, instead of providing complete removable units as hereinbefore stated, I may provide each clamp bracket 25, with a short arm 44, carrying a cutter wheel, without the pulley attached, identical to the clamp and cutter arm used for cutting the end portions from the dough strips as in Fig. 2, and for spreading the cut sections mount the pulleys on separate shafts 45 and 46, supported for rotation in upstanding bearings 47, fixed to the side frames, only one of which is shown.

These shafts located forward of the cutters, have the pulleys 48 adjustable along the shafts to any desired position thereon, so the belts 49 driven by the pulleys may engage the cut sections, at any portion thereof, at the first contact therewith, and by an offset position of the pulleys of the shaft 46, will move the sections to the right, and to the left, as may be required. Instead of the cutter knives driving the belts, here I drive the shaft 46, by a pulley 50, fixed to the end of the shaft to be driven by a pulley 51, that may be attached to the pulley 17, that drives the drum 8, this pulley 51 is indicated in dotted lines in Fig. 2.

In Fig. 6, I show a side view of a dough strip, the broken lines indicate the sections after cutting, at the center of each section it is often desirable to heavily score the same, as at 52, for the purpose of breaking the sections, at this part after baking. This scoring may readily be accomplished by adding cutting knives, which are somewhat smaller in diameter, and therefore will not sever the strips entirely, these scoring knives otherwise identical to the knives, used for trimming the ends of the strips, and similarly mounted, and may be added and placed between the severing knives, as will be readily understood. It will be understood, I do not limit my invention to the precise showing thereof, changes may readily be made without departing from the scope of the invention.

Having described my invention, I claim:

1. A machine for bakers' use, adapted to sever strips of prepared dough into sections and spread the sections, comprising a moving platform, for moving peel boards on which dough strips are supported, in continuation and succession along the length of said platform, from the beginning to the end thereof, means to sever the strips into sections at the beginning of said movement, and means succeeding the severing action, adapted to spread the sections, on the peel boards.

2. A machine for cutting strips of dough into equal sections, discharging waste portions thereof, and spreading the cut sections preparatory to baking, comprising a supporting frame, a moving platform at the top thereof, adapted to support peel boards carrying strips of dough, and advance them on the platform, one following the other in close succession to be delivered at the other end of the moving platform, means at the beginning of the movement to sever the strips, means to guide the waste end portions into a receptacle, and means to spread the sections to uniform spread position prior to the discharge of the peel boards from the moving platform.

3. A machine for cutting strips of dough into sections, discharging waste portions thereof, and spreading the sections preparatory for baking, comprising means to continuously propel peel boards carrying dough strips under adjustable rotary cutting knives, rotated by contact with the said moving peel boards to cut the strips into sections, means connected with the cutters and actuated thereby, to feed the cut sections forward with the peel boards, and during said movement move the cut sections laterally, to separate the same, said means, including a series of units all of which are adjustably supported at the front and rear ends thereof on elevated supporting bars under which the peel boards and strips are adapted to pass, each unit embodying a clamp bracket adjustably carried by the front support, a pivoted arm attached to the bracket, having a stud on which a rotary knife with a pulley attached is mounted, a hinge portion of the arm forward of the knife to join with a hinge portion of a swinging arm the free end of which is adjustable for angular positions in notches of said rear supporting bar, a pulley on the swinging arm over which a belt is guided and driven from said knife pulley, and idler pulleys at the joint of the swinging arm, to guide the belt in its angular direction, and means to guide the waste end portions of the dough strips into a receptacle during the cutting and spreading operation.

4. A machine for cutting strips of dough into sections, discharging waste end portions thereof, and spreading the sections preparatory for baking, comprising means to continuously advance peel boards carrying dough strips, on a moving platform under adjustable rotary cutting knives, rotated by the advancing action of the said moving peel boards, to cut the strips into sections, means to feed the cut sections forward with the peel boards, and move the cut sections laterally, to separate the same, and means located between the cutting and the spreading means to discharge waste end portions of the strips into a receptacle.

5. A machine for scoring and cutting strips of dough into sections, discharging waste end portions thereof, and spreading the sections preparatory for baking, comprising means to continuously advance peel boards carrying dough strips on a moving platform under adjustable rotary cutting and scoring knives, rotated by the advancing action of the said moving peel boards and dough strips thereon, to cut the strips into sections, means to feed the cut sections forward with the peel boards, and move the cut sections laterally, to separate the same, including belts, one for each section, driven over a pair of pulleys fixed on spaced shafts to engage the cut sections at the top thereof, said pulleys of each pair adjustable on the shafts, one shaft being mounted close to the cutter knives and having the pulleys adjusted with the belts thereon in engagement with the cut sections, said shaft being driven by the other of said shafts and being the driven shaft on which the pulleys are adjusted to an offset position, so the belts will feed the cut sections laterally to separate the same, and means between the cutting and the spreading means to discharge waste end portions of the strips into a receptacle.

REINHART W. PITTMAN.